3,623,904
ELASTOMERIC COMPOSITION CONTAINING SILICON CARBIDE FOR USE AS AN ABLATIVE COATING
James A. Ramseyer, Linwood, Mich., assignor to Dow Corning Corporation, Midland, Mich.
No Drawing. Continuation-in-part of application Ser. No. 669,307, Sept. 20, 1967, which is a continuation-in-part of application Ser. No. 600,066, Dec. 9, 1966. This application Feb. 10, 1969, Ser. No. 798,188
Int. Cl. B32b 15/08, 27/20; B44d 1/36
U.S. Cl. 117—135.1                                 7 Claims

ABSTRACT OF THE DISCLOSURE

A method for protecting the surface of aerospace vehicles from the eroding effects of turbulent gases and extremely severe temperatures which method consists of coating the surface of the vehicle with an organosiloxane elastomer which has included therein specific quantities of powdered silicon carbide, silica and a high temperature decomposing fiber which melts at a temperature above 3000° F.

---

This application is a continuation-in-part of application Ser. No. 669,307, filed Sept. 20, 1967 which is in turn a continuation-in-part of application Ser. No. 600,066, filed Dec. 9, 1966, both now abandoned.

This invention relates to the use of a novel filler for organosiloxane elastomers employed as ablative coatings for aerospace vehicles and more particularly to the use of silicon carbide as the pertinent filler.

Ablative coatings are used in various portions of aerospace vehicles and their general function is to provide a protective mechanism or the like whereby the skin or other parts of the vehicle are not adversely affected by the hot turbulent gases and extremely high temperatures which the vehicle necessarily encounters. The high temperatures occur when the vehicle passes at high speed through the atmosphere, e.g., especially when the vehicle re-enters the earth's atmosphere upon return of its flight. In addition, numerous other portions of the vehicle may be affected by the strong flame that is initiated by rocket propellant substances. In the latter case, the outside of the nozzles, the end of the vehicle and the inside of the fuel compartment are subjected to tremendous temperatures and pressures which are generated by this flame which is capable of destroying even the most efficient and best high temperature alloys of iron, titanium, chromium, nickel, beryllium and others, unless they are adequately protected in some manner.

In the past, attempts have been made to protect those parts of the vehicle which are deleteriously affected by the harsh conditions described above. The attempts have been principally directed to methods of protecting the vehicle structure by the application of some type of a protective coating or lining to those surfaces that are exposed to the burning propellant and hot turbulent gases. Among the materials employed to achieve this purpose are plastics such as phenolic resins, epoxy resins, high temperature melamineformaldehyde coatings, ceramics, polyester resins and the like. For example, in order to prepare nozzles that possess the required ablative properties, one normally fabricates a liner composed of a phenolic resin reinforced with a graphite carbon or silica cloth. The inherent disadvantage involved in this method is the attendant excessive cost due to the length of time required to perform the task, the resulting increase in labor, and the expensive fixtures which are imperative.

In accordance with the above, it is an object of the present invention to provide an ablative coating for use at temperatures above 3,000° F. which can be conveniently applied to the appropriate surface absent the costly expense which necessarily accompanies prior art methods.

Another object of this invention is to provide an ablative coating which can be refurbished with ease in contrast to prior art methods, e.g., the char of the original ablative coating can be readily removed by conventional means and a new coating of virgin material can be easily applied over the remaining portion of the original material.

These and other objects and advantages thereof will become readily apparent from a consideration of the following detailed description of the invention.

This invention relates to a method for protecting the surfaces of aerospace vehicles from the eroding effect of gases at temperatures above 3,000° F. which comprises coating said surfaces with a composition consisting of
(A) A silicone elastomer,
(B) From 1.0 to 100 parts by weight of silicon carbide,
(C) From 1.0 to 250 parts by weight of silica,
(D) From 0.1 to 15 parts by weight of a high temperature decomposing fiber which melts at a temperature above 3000° F., said parts of (B), (C) and (D) being based on each 100 parts by weight of organosiloxane polymer in (A).

For purposes of this invention, the silicone elastomer (A) is meant to include commercially available silicon elastomers well known in the art. Hence, silicon elastomers based on polymers of the general formula $[R_2SiO]$, in which R is a hydrocarbon or substituted hydrocarbon radical will suffice. Illustrative examples of R radicals are the methyl, vinyl, phenyl and 3,3,3-trifluoropropyl radical, among numerous others.

The silicon elastomers of this invention can also be heat curable or room temperature vulcanizing elastomers and can be cured by suitable vulcanizing agents well known in the art. Thus, curing can be effected by the usef of peroxides such as benzoyl peroxide, t-butyl perbenzoate, ditertiary butyl peroxide, dichlorobenzoyl peroxide, or dicumyl peroxide or they can be cured by subjecting the coating to electromagnetic radiation or electron radiation, or they can be of the so-called room temperature curing type mentioned above. The latter, as is well known, fall into three main classes; namely, those cured by incorporating alkyl silicates and suitable catalysts, those cured by incorporating SiH compounds and vinyl on silicon in the presence of a platinum catalyst, and the one component room temperature curing elastomers in which the molecule contains a plurality of hydrolyzable groups such as acetoxy or oxime groups which react with the moisture of the atmosphere to effectively cure the siloxane.

Envisioned and contemplated within the scope of this invention are those elastomers which are disclosed in U.S. Pats. 2,560,498; 2,541,137; 2,561,177; 2,571,039; 2,658,882; 2,718,512; 2,721,857; 2,723,966; 2,728,743; 2,751,314; 2,759,904; 2,803,619; 2,811,408; 2,833,742; 2,842,520; 2,863,846; 2,902,467; 2,927,907; 2,956,032; 2,999,076; 3,006,878; 3,065,201; 3,122,522; 3,137,670; and 3,179,619, as well as countless others.

It is of importance to note that the room temperature vulcanizing elastomers are particularly suitable in the present invention since they can be conveniently applied and cured upon the surface of the aerospace vehicle with a minimum amount of time, labor and expense involved. A room temperature vulcanizing elastomer of the type defined in U.S. Pat: 3,268,359 was found to provide optimum ablative properties and the plurality of advantages desired herein.

Preferably, the silicon elastomers of this invention can also contain other fillers which aid in stabilizing the composition. These additional fillers include diatomaceous earth, crushed quartz and silicates such as aluminum silicate, aluminum magnesium silicate, clay and zirconium silicate and metal oxides such as $TiO_2$, ferric oxide and the like. Hence, it is apparent that other filters which can be employed in this invention are the conventional inorganic fillers normally used in organosiloxane elastomers.

The amount of silicon carbide (B) required to improve the ablative properties of the coating is critical within the above-stated limits. Powdered silicon carbide having a fine particle size and a high degree of purity is to be preferred. Thus, silicon carbide having a particle size of from 200 to 1,000 mesh is perfectly suitable and operative in the present invention, although a particularly desirable particle size is approximately 500 mesh. The preferred silicon carbide also has a purity of more than 99 percent. In any event, using a finely divided high purity powdered silicon carbide requires, for excellent ablative properties, from 1.0 to 100 parts of powdered silicon carbide per 100 parts of organosiloxane polymer in the elastomeric material. If less than 1.0 part of the powdered silicon carbide is employed, the ablative properties of the coating are not significantly increased over the elastomeric material containing no silicon carbide whereas, if more than 100 parts of the powdered silicon carbide is employed, the relative improvement in the ablative properties of the coating becomes correspondingly insignificant, and if too great a quantity of silicon carbide is used, the consistency of coating may be ultimately destroyed. Optimum results were obtained when approximately 10 parts of silicon carbide per 100 parts of organosiloxane polymer in the elastomeric material were used and hence, this amount is to be preferred.

The precise function of the silicon carbide in the present invention is not known; however, it is believed that the inclusion of the silicon carbide substantially increases the molten viscosity of the ablative coating itself and therefore, when the aerospace vehicle is in flight, the ablative coating preferentially tends to remain in adherence on the surface of the aerospace vehicle and as a result, protects the surface from severe temperatures and turbulent gases.

The amount of silica (C) employed to impart the necessary ablative properties to the coating is also critical within the above-stated limits. Although from 1.0 to 250 parts by weight of silica based on 100 parts by weight of the organosiloxane polymer in the elastomeric material is perfectly satisfactory, it has been found that approximately 100 parts by weight of silica provides optimum ablative properties, hence this amount is to be preferred.

The amount of high temperature decomposing fibers (D) which melt at a temperature above 3000° F. required to impart the necessary ablative characteristics to the coating in question is also critical within the aforementioned limits. Thus, although from 0.1 to 15 parts by weight of a high temperature decomposing fiber based upon 100 parts by weight of the organosiloxane polymer in the elastomeric material has been found suitable, approximately 8.0 parts of the high temperature decomposing fiber provides optimum properties and hence, is the preferred amount.

The size of the high temperature decomposing fibers can range in length from 30 microns to 1 inch, and are preferably about 600 to about 1200 microns in length. The high temperature decomposing fibers orient themselves in scattered fashion throughout the coating and tend to tie the resultant char to the virgin material, thus preventing the coating from flaking off when the aerospace vehicle is subjected to the extremely high temperatures and high shear created by re-entry and turbulent gases.

Illustrative of the high temperature decomposing fibers which have been found to function herein include commercially available materials such as carbon, graphite, silica, nitrides, borides, oxides and silicates amongst others.

The necessary components can be added to one another in any order without fear of any resultant deleterious effects. The fiber (D) is preferably one of the last components to be incorporated in a stock to reduce the possibility of a breakdown of the fibers during mixing. The compositions of this invention can be mixed in any feasible manner, thus they can be mixed either by hand or by mechanical means whichever method appears to be most suitable for the purpose.

The compositions of this invention can be applied to the surface of the aerospace vehicle by any convenient method and thereafter cured. Thus, the compositions can be sprayed on, formed in place, or trowelled or buttered upon the surface. The thickness of the coating varies depending upon the heat flux to be encountered during use. Ordinarily the greater the heat flux, the thicker the coating.

The following examples are illustrative only and should not be construed as limiting the invention which is properly delineated in the appended claims.

EXAMPLE 1

The effectiveness of the compositions of this invention as ablative coatings was shown by subjecting samples of the cured elastomeric compositions to the flame of a kerosine-oxygen torch adjusted to give a reducing flame having a temperature of between 5000° F. and 6000° F. and a velocity of about 5,500 feet per second. This subjects the sample to high temperatures and the eroding effects of turbulent gases. Compositions were compounded into the formulations shown below and in each case the composition was cured into a slab about 1.5 x 4 inches. The composition was vulcanized and the sample subjected to the flame of the torch, and the time it took for the flame to penetrate the slab was determined in each case.

The performance index (which is the figure of importance) was then determined employing rate of penetration in conjunction with specific gravity according to the formula $$PI = \frac{100}{Sp.\ Gr. \times PR}$$

The results are shown in the table below.

Sample 1.—100 parts [1] of vinyl endblocked copolymer of 0 mol percent dimethylsiloxane and 30 mol percent phenylmethylsiloxane, 100 parts of silica, 10 parts of silicon carbide and 20 parts of a mixture consisting of 73.5 parts of a vinyl containing polydimethylsiloxaane, 25.0 parts of a copolymer of $(CH_3)_2HSiO_{0.5}$, $(CH_3)_3SiO_{0.5}$ $(CH_3)_2SiO$ and $CH_3HSiO$ units and 1.5 parts of a methylvinylsiloxane polymer. A platinum catalyst was added and this sample was prepared by milling the above ingredients until a uniform mass was obtained.

Sample 2.—Sample 2 was identical to Sample 1 except that it contained 4.0 parts of carbon fibers.

Sample 3.—Sample 3 was identical to Sample 1 except that is also contained 8.0 parts of carbon fibers.

Sample 4.—Sample 4 was identical to Sample 1 except that it contained 12 parts of carbon fibers.

Sample 5.—Sample 5 was identical to Sample 1 except that it contained 100 parts of powdered silicon carbide and 4.0 parts of carbon fibers.

Sample 6.—Sample 6 was identical to Sample 1 except that it contained 50 parts of powdered silicon carbide and 8.0 parts of carbon fibers.

Sample 7.—Sample 7 was identical to Sample 1 except that it contained 20 parts powdered silicon carbide and 8.0 parts of carbon fibers.

---
[1] All parts are parts by weight.

Sample 8.—Sample 8 was identical to Sample 1 except that it contained 10 parts of powdered silicon carbide and 8.0 parts of carbon fibers.

Sample 9.—Sample 9 was identical to Sample 1 except that it contained 0 parts of powdered silicon carbide and 0 parts of carbon fibers.

Sample 10.—Sample 10 was identical to Sample 1 except that it contained 10 parts powdered silicon carbide and 8.0 parts of graphite fibers.

Sample 11.—Sample 11 was identical to Sample 1 except that it contained 100 parts powdered silicon carbide and 4.0 parts silica fibers.

Sample 12.—Sample 12 was identical to Sample 1 except that it contained 1.0 part powdered silicon carbide and 8.0 parts carbon fibers.

TABLE

| Sample: | Performance Index [1] |
|---|---|
| 1 | 1.25 |
| 2 | 16.20 |
| 3 | 62.00 |
| 4 | 41.80 |
| 5 | 13.20 |
| 6 | 31.00 |
| 7 | 39.00 |
| 8 | 62.00 |
| 9 | 6.80 |
| 10 | 28.00 |
| 11 | 20.00 |
| 12 | 28.50 |

[1] The greater the Performance Index figure, the better the ablative properties. For present purposes, a Performance Index greater than 10 is considered good.

EXAMPLE 2

When the following amounts of silica, powdered silicon carbide and high temperature decomposing fibers are substituted for the corresponding materials in Sample 2, a Performance Index of greater than 10 was obtained.

(A) 10 parts powdered silicon carbide, 1.0 part silica and 15 parts of carbon fibers.

(B) 10.0 parts powdered silicon carbide, 250 parts silica, and 0.1 part carbon fibers.

As indicated in the above table, Sample 1 which contained no high temperature decomposing fibers had an extremely poor Performance Index. Sample 9 which contained no silicon carbide and no fibers was also extremely poor. Sample 3 clearly represents excellent ablative properties when optimum portions of silicon carbide and fibers are employed.

That which is claimed is:

1. A method for protecting the surfaces of aerospace vehicles from the eroding effect of gases at temperatures above 3000° F. which comprises coating said surfaces with a composition consisting of
   (A) a silicon elastomer,
   (B) from 1.0 to 100 parts by weight of silicon carbide,
   (C) from 1.0 to 250 parts by weight of silica,
   (D) from 0.1 to 15 parts by weight of a high temperature decomposing fiber which melts at a temperature above 3000° F., said parts of (B), (C) and (D) being based on each 100 parts by weight of organosiloxane polymer in (A).

2. The method as recited in claim 1 wherein there is 10 parts of (B).

3. The method as recited in claim 2 wherein there is 100 parts of (C).

4. The method as recited in claim 3 wherein there is 8.0 parts of (D).

5. The method as recited in claim 4 wherein (D) is a carbon fiber.

6. The method as recited in claim 5 wherein the organosiloxane polymer is a copolymer of 70 mol percent dimethylsiloxane and 30 mol percent phenylmethylsiloxane.

7. The method as recited in claim 5 wherein the silicon elastomer is conventionally filled and is cured at room temperature.

References Cited

UNITED STATES PATENTS

| 3,240,731 | 3/1966 | Nitzsche et al. |
| 3,268,359 | 8/1966 | Boyd et al. |
| 3,377,370 | 4/1968 | Papetti. |
| 3,429,838 | 2/1969 | Hersh. |
| 3,472,812 | 10/1969 | Byrne et al. |
| 3,506,607 | 4/1970 | Bobear. |

OTHER REFERENCES

Industrial and Engineering Chemistry, vol. 57, No. 3, March 1965, p. 55.

WILLIAM D. MARTIN, Primary Examiner

H. J. GWINNELL, Assistant Examiner

U.S. Cl. X.R.

117—6, 132, 161; 260—37